C. E. ROYER & A. A. RICKERT.
FRUIT AND VEGETABLE SLICER.
APPLICATION FILED AUG. 23, 1906.
1,040,582.
Patented Oct. 8, 1912.
2 SHEETS—SHEET 1.
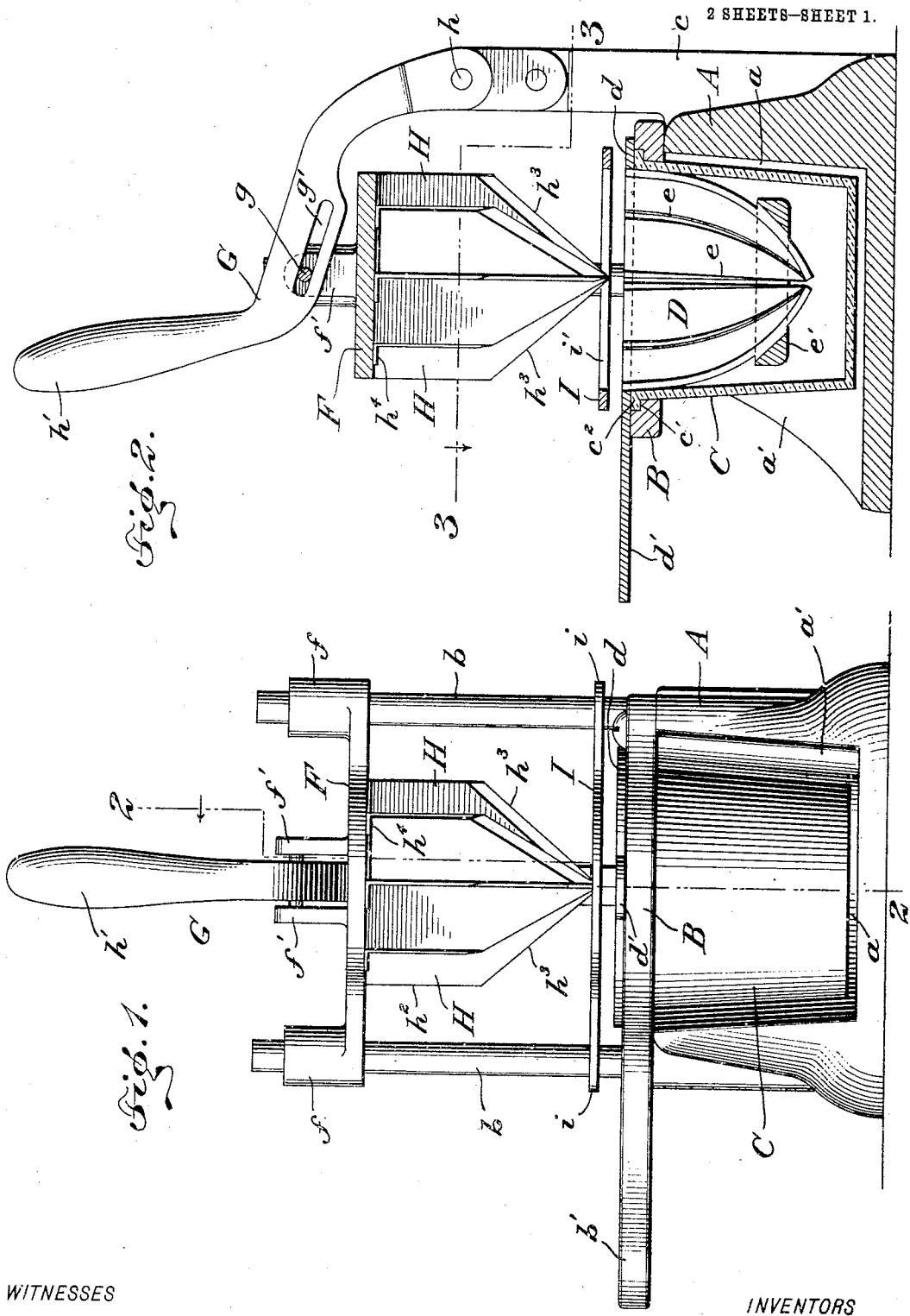
WITNESSES
INVENTORS
Charles E. Royer
August A. Rickert
BY
Griffin & Bernhard
ATTORNEYS C. E. ROYER & A. A. RICKERT.
FRUIT AND VEGETABLE SLICER.
APPLICATION FILED AUG. 23, 1906.
1,040,582.
Patented Oct. 8, 1912.
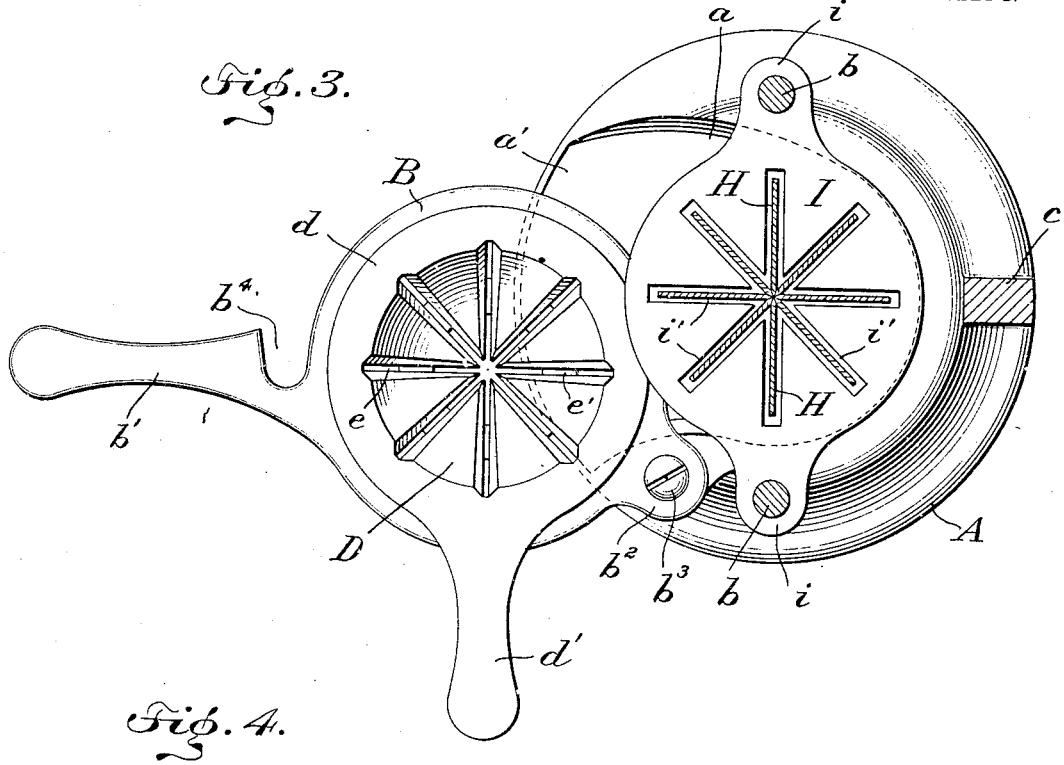
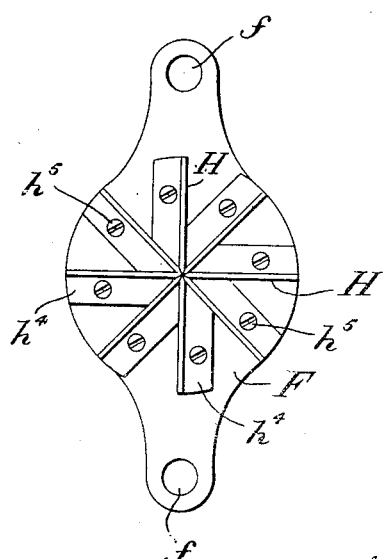
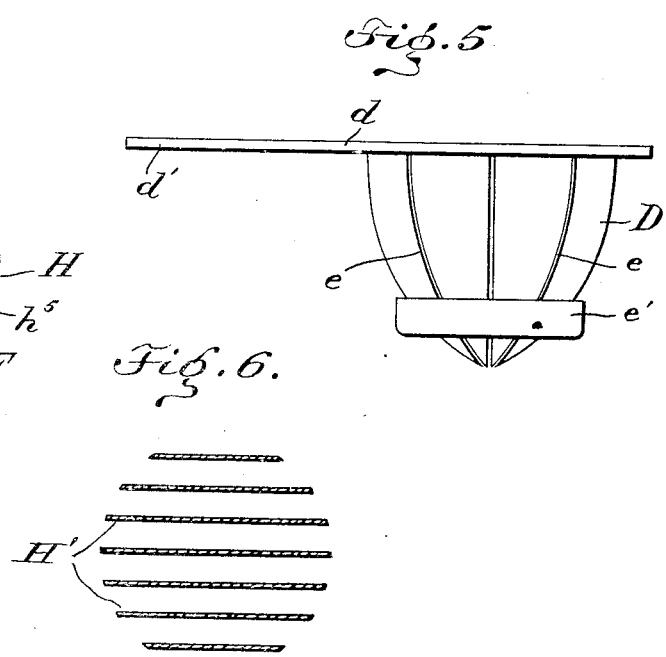
WITNESSES
W. C. Abbott
V. E. Nichols
INVENTORS
Charles E. Royer
August A. Rickert
BY Griffin & Bernhard
ATTORNEYS

UNITED STATES PATENT OFFICE.

CHARLES E. ROYER AND AUGUST A. RICKERT, OF ERIE, PENNSYLVANIA.

FRUIT AND VEGETABLE SLICER.

1,040,582.   Specification of Letters Patent.   Patented Oct. 8, 1912.

Application filed August 23, 1906. Serial No. 331,713.

*To all whom it may concern:*

Be it known that we, CHARLES E. ROYER and AUGUST A. RICKERT, both citizens of the United States, and both residing at Erie, in the county of Erie and State of Pennsylvania, have invented a new and useful Fruit and Vegetable Slicer, of which the following is a specification.

This invention is a device for cutting fruits and vegetables into slices uniformly and regularly.

One object of the invention is a device of simple and cheap construction by which the operation of slicing a fruit or vegetable may be performed with ease and rapidity.

Another object is to accomplish the cutting operation without exerting appreciable pressure on the substance under treatment, thus avoiding a tendency to "squeeze" the substance, whereby slicing of the fruit or vegetable may be accomplished without setting free any substantial quantity of juice.

A further object is to provide means for collecting the small quantity of juice which may escape during the cutting operation.

The several parts of the device are arranged to be easily separated for emptying the fruit and the juices, and for cleansing them. The part for holding the substance while it is being cut is removable with the sliced fruit for the purpose of holding the slices closely together, thus confining the sliced fruit or vegetable so as to expose to the air a comparatively small area of the surface cut by the device.

One feature of the invention comprises a receptacle for holding a fruit or vegetable, and cutting mechanism adapted to enter said receptacle and sever the fruit into slices, said receptacle being removable with the sliced contents therein.

In one practical form of the invention, the receptacle is a cup provided with slots, the latter being adapted to receive the knives or blades of said cutting mechanism. The cup may be variously shaped and made in various sizes according to the nature of the fruit or vegetable it is intended to receive. The cutting mechanism may have its knives or blades arranged in different ways; for example, the blades may radiate from a common center, in order that the cutter may enter the substance with the least resistance, exert a draw or shear cut thereon, and divide or sever the fruit into segmental slices. Again, the cutter may be provided with parallel knives, or any other arrangement of such knives may be employed to adapt the cutter for special uses.

The invention consists, also, in the employment of a stripper coöperating with the knives of the cutting mechanism and operating to prevent the substance under treatment from following the knives on their withdrawal from the aforesaid slotted cup.

The invention consists, further, of an adjustable carrier for a liquid collecting vessel, said carrier being, preferably, pivoted to the base of the device and adapted to be swung out of line with the cutting mechanism for the purpose of removing the collecting vessel and the slotted receptacle without liability of the operator's hands touching the cutting mechanism.

In the drawings, Figure 1 is a front elevation of a device for slicing fruits and vegetables embodying our invention; Fig. 2 is a vertical section on the line 2—2 of Fig. 1; Fig. 3 is a sectional plan view, the plane of the section being indicated by the dotted line 3—3 of Fig. 2; Fig. 4 is a plan view of one type of cutting mechanism which we may employ in our device; and Fig. 5 is a detail view in side elevation of a cup adapted to hold the substance to be sliced. Fig. 6 is a cross section through another form of cutting mechanism wherein we employ parallel blades.

In the construction of our device, shown by the drawings, we employ a base A, the same being provided with a chamber $a$, which opens through one side of the base, as indicated at $a'$ in Figs. 2 and 3 of the drawings. Extending upwardly from the base, at the respective sides thereof, are short vertical posts $b$, which may be attached to the base, or cast in one piece therewith, and from the rear portion of the base extends another post $c$, the latter being provided on the side of the base opposite to the opening $a'$, and being situated about midway between the guide posts $b$.

B designates a carrier or support for a liquid containing cup or receptacle C. The carrier is shown by the drawings in the form of a plate or ring having a handle $b'$, and a lug $b^2$, said carrier being arranged to rest upon the upper part of the base A, in one position thereof. Said carrier, however, is connected to the base for movement relative thereto, and, as shown, the carrier is attached pivotally to said base by means of a pin or screw $b^5$, the latter passing through the lug $b^2$, and being secured to said base at a point quite close to one of the guide posts $b$. It is evident that the carrier B may be swung in a horizontal plane on the axis afforded by the pivots $b^3$, whereby the carrier may be adjusted to rest on the base substantially as shown by Figs. 1 and 2, or it may be swung outwardly from said base to the position shown by Fig. 3.

In the upper edge of the carrier is provided a recess $c'$, adapted to receive a circumferential flange $c^2$, which is provided at the upper edge of the liquid collecting vessel C. This vessel C may be made of any suitable material, as for example, glass, and it is fitted to the carrier B, for the flange $c^2$ to rest within the recess $c'$, thus detachably connecting the vessel C to the carrier, and suspending said vessel from said carrier. When the carrier B is adjusted to rest upon the base A, the vessel C occupies the chamber $a$ of the base, and it is in vertical alinement with a cutting mechanism, but when the carrier is swung outwardly around the pivots $b^3$, the vessel C moves with said carrier, and passes through the opening $a'$ of the base, thereby shifting the vessel C out of alinement with said cutting mechanism. The carrier B, or its handle $b'$, is provided with a notch $b^4$, in one edge thereof, as shown by Fig. 3, and when said carrier is adjusted to rest on the base, one of the posts $b$ fits within said notch $b^4$.

An important feature of this invention is a receptacle for holding the fruit or vegetable, while the latter is subjected to the action of the cutting mechanism. The receptacle may be of various sizes and shapes, but, in Figs. 2, 3 and 5 of the drawings, we have represented a form of said receptacle which is especially adapted for use in holding one half of a lemon. The receptacle D is represented as a cup open at the upper portion, and tapering toward its bottom portion. This cup is provided, at its upper edge, with a ring or plate $d$, which, as shown, is extended to form a suitable handle $d'$. The cup D is provided with a number of slots $e$, which extend longitudinally thereof, and in the construction shown by Figs. 2 and 5, these slots meet or merge one into the other at the lower pointed end of the cup. The sections of the cup which are formed by the division slots $e$, are held in proper relation in any suitable way, such as by the ring $d$, and the external band $e'$, the latter being provided externally of the cup, and near the lower pointed end thereof. The cup D, and its ring $d$, are adapted to be supported by the carrier B, and, as shown in Figs. 2 and 3, the ring $d$ rests on the carrier B, and the flanged edge $c^2$ on the liquid collecting vessel C. The slotted cup D extends into the vessel C, and said slotted cup is fitted removably to the carrier, and within said vessel C, whereby the slotted cup and its ring $d$, may easily be lifted out of the vessel C, and away from the carrier B, the handle $d'$ affording convenient means for the manipulation of said slotted cup.

In the embodiment of the invention shown by the drawings, the knives or blades of the cutting mechanism are carried by a crosshead F, shown more particularly by Figs. 1, 2 and 4 of the drawings. Said crosshead is represented as a plate having perforated lugs or bosses $f$, the latter being arranged to fit loosely on the guide posts $b$ of the base. Between the bosses $f$, the crosshead F is provided on its upper side with other lugs $f'$, which support a connecting pin $g$, the latter being arranged to play or move in a slot $g'$, which is provided in one part of an angular operating lever G. The rear lower part of said operating lever is connected by a pin $h$, to the upper end of the fulcrum post $c$, and said lever G is provided with a handle $h'$, whereby the lever may be operated readily for the purpose of raising and lowering the crosshead F on the posts $b$ of the base.

One form of the cutting mechanism suitable for use in connection with the slotted cup B is shown by Figs. 1, 2, 3 and 4 of the drawings, as comprising a plurality of knives or blades H, each blade consisting of a flat piece of metal having a straight cutting edge $h^2$, and a beveled cutting edge $h^3$. The blades are provided at their upper ends with flanges $h^4$, adapted to engage with the underside of the crosshead F, to which the blades are secured by means of screws $h^5$, or their equivalents. Said blades are arranged in radial positions, for the inner edges thereof to meet or engage one with the other at the axis or longitudinal center of the cutter, and the beveled edges $h^3$ of said blades converge downwardly to the center of the cutter, thus giving the cutter a pointed or conical shape. The blades of the cutting mechanism are attached rigidly to the crosshead for the purpose of moving vertically therewith when said crosshead is raised and lowered on the guides $b$, by operating the hand lever G. As shown by the drawings, the cutting mechanism comprises eight blades or knives, which are arranged on the crosshead to coöperate with a similar number of slots $e$, in the cup D, said form of cutting mechanism and cup being adapted to divide a lemon into eight slices. We do not, however, desire to confine ourselves to the special arrangement and construction of the knives H, herein shown and described, because these knives may be arranged in different ways for the purpose of slicing a fruit or vegetable into parallel slices, instead of segmental pieces. It is evident that a suitable number of knives may be arranged parallel to each other, as shown in Fig. 6 of the drawings, and that the slots in a fruit or vegetable holding receptacle may be arranged in parallel order, so as to correspond to the positions of the knives.

For the purpose of withdrawing the knives and blades easily and quickly from the substance in the cup D, we provide a stripper I, through which the knives or blades are adapted to move freely. The stripper is shown by Fig. 3 as a plate having lugs $i$, fitting on the guide posts $b$, and said plate is provided with slots $i'$, corresponding in number and arrangement to the blades of the cutter. As shown, the stripper is provided with eight slots arranged radially, and meeting at a common center, and through these slots are adapted to travel the blades H, when the crosshead is raised or lowered. The stripper is fitted to the guide posts to lie above the base, the carrier, the liquid collecting vessel, and the slicing cup, said stripper being independent of the aforesaid parts. The stripper may be fitted loosely on the posts B to have a limited up and down movement thereon, or said stripper may occupy a stationary position above the base.

The operation of our invention of slicing a lemon is as follows:—The fruit is cut in half, and one half is placed in the cup D. The carrier B having been swung outwardly to the position shown by Fig. 3, and the lever G having been raised to lift the cutting mechanism to a raised position, the liquid collecting vessel C is slipped into the carrier B, so as to be suspended therefrom, and the slotted cup D, with the lemon therein is then slipped into the carrier and the vessel C, the ring $d$, of said cup D, resting on the carrier and the flanged edge of the vessel C. The carrier is now swung back into position over the base A, for one of the posts $b$ to enter the notch $b^4$, for the vessel C to occupy the chamber $a$ of said base. The cup D, and the vessel C are in alinement vertically with the slotted stripper I, and the knives of the cutting mechanism. The operator now depresses the lever G, and forces the cutter head F downwardly, whereupon the blades or knives H are moved through the slots $i'$ of the stripper, and through the lemon contained in the cup B, and, also, into or through the longitudinal slots $e$ of said cup D.

It will be observed that the crosshead F moves in a rectilinear path, and that the beveled edges $h^3$ of the blades H cut from the center downwardly and upwardly, thus making said knives or blades operate on the fruit with a draw and shear cut, the effect of which is to easily and cleanly cut through the fruit without exerting appreciable pressure thereon. In other words, the fruit is cut into slices easily and quickly, without subjecting it to a squeezing action which would have a tendency to express the juice from the fruit, and, in our invention, the fruit or vegetable is sliced in a way to set free as little of the juice as possible. The small quantity of juice which does escape from the fruit is caught or collected in the receptacle C. After forcing the crosshead and the cutter downwardly in the manner described for slicing the fruit or vegetable, the operator lifts the lever G, and with it the crosshead and the knives. During the upward movement of the knives they travel easily through the slots $i'$ of the stripper, the latter operating on the contents of the slotted cup D to prevent the same from following the upward movement of said knives. When the cutter is raised sufficiently to clear the cup D, the carrier B may, by its handle $b'$, be swung outwardly, thus correspondingly moving the vessel C, and the cup D, whereupon the cup D may easily be lifted out of the carrier and the vessel. The sliced fruit may remain in the cup D, which will thus serve as a receptacle in keeping the slices of the fruit quite close together, and excluding the free access of air to the surfaces of the slices, whereby the fruit may be kept in a comparatively fresh condition. If desired, another cup D may be placed in the carrier with another half of a lemon, and the operation heretofore described may be repeated. It will be convenient, however, that the sliced fruit or vegetable may be discharged from the cup D, and the latter replaced in the carrier, so as to use the same cup repeatedly in the operation of slicing the fruit or vegetable.

Our new slicing device may be employed for cutting any kind of fruit or vegetable into slices of various shapes, and it is evident that the device may be employed to excellent advantage in slicing pine-apples, oranges, apples, tomatoes, and, in fact, any fruit or vegetable.

Instead of cutting the lemon or other fruit or vegetable in half, as heretofore described, we may place a whole fruit or vegetable in a slotted cup of suitable shape and dimensions.

It is evident that the vessel C, and the cup D, may be removed from the apparatus for the purpose of quickly and thoroughly cleansing the same, and, furthermore, the blades H of the cutter are exposed for ready access, so that they may likewise be thoroughly and quickly cleaned.

Having thus described our invention, what we claim as new and desire to secure by Letters Patent is:—

1. In a device of the class described, means provided with radial slots, for holding the material to be severed, and reciprocating cutting mechanism comprising radial blades coöperating with said holding means and the slots therein and adapted to divide the material while retaining its shape.

2. In a device of the class described, a receptacle for holding and embracing the material to be operated upon, said receptacle being provided with knife slots, reciprocating cutting mechanism provided with radially inclined knives which are adapted to enter said receptacle and traverse the slots therein, whereby the material may be severed while retaining its shape.

3. In a device of the class described, a frame, a receptacle provided with slots for holding the material to be severed, a lever pivoted to the frame, movable cutting mechanism operated by said lever and having a slidable connection therewith, said cutting mechanism having a plurality of cutting edges which diverge from a common center and enter the slots in said receptacle.

4. In a device of the class described, a receptacle for holding the material to be severed, said receptacle being provided with slots radiating from a common center, movable cutting mechanism provided with radially arranged knives, the cutting edges of which diverge from a common center, said knives being adapted to traverse said slots, and a juice receiver coöperating with the holding receptacle for receiving juice therefrom.

5. In a device of the class described, a cross head movable in a rectilinear path, a plurality of knives carried by said cross head, means for operating said cross head, a receptacle having openings therein to permit the escape of liquid for holding the material to be severed, and an imperforate receptacle surrounding and supporting said perforated receptacle, for receiving juice therefrom.

6. In a device of the class described, a base, a carrier movable thereon, a receptacle supported by the carrier and removable therefrom, and cutting mechanism adapted to enter said receptacle and to cut material placed therein, and means for moving the carrier out of the path of the cutting mechanism.

7. In a device of the class described, a movable carrier, two receptacles supported by the carrier, one being perforated and adapted to support the substance to be cut, and the other so positioned as to collect juice from said perforated receptacle, and reciprocating cutting mechanism adapted to enter said perforated receptacle and to cut material which may be placed therein.

8. In a device of the class described, a base or frame, a juice collecting receptacle, a substance-holding receptacle provided with openings for permitting the escape of liquid therefrom, said receptacle being separately removable, and movable reciprocating cutting mechanism adapted to operate in said substance-holding receptacle.

9. In a device of the class described, a base or frame, a carrier movable relative thereto, a plurality of receptacles supported by said carrier, and reciprocating cutting mechanism adapted to operate on a substance in one of the receptacles.

10. In a device of the class described, a pivoted carrier, a perforated receptacle fitted removably to said carrier and movable therewith, cutting mechanism adapted to enter said perforated receptacle and to cut material which may be placed therein, and means for moving said carrier out of the path of the cutting mechanism.

11. In a device of the class described, a pivoted carrier, a collecting vessel supported by the carrier, a slotted substance-holding receptacle also supported by the carrier, and cutting mechanism adapted to coöperate with said slotted receptacle, said carrier and cutting mechanism being relatively movable so as to bring them out of alinement.

12. In a device of the class described, a frame, means detachable from said frame for holding the material to be cut and provided with openings, cutting mechanism guided by said frame, and a stripper supported by the frame in the path of the cutting mechanism and above the aforesaid holding means for the material to be cut.

13. In a device of the class described, a plurality of blades, means for holding in the path of said blades the material to be cut, said holding means being provided with slots for the entry of said blades, and a slotted stripper through which said blades are adapted to operate.

14. In a device of the class described, a frame, a fruit receptacle provided with knife passages, said fruit receptacle being removably supported on the frame, and cutting mechanism adapted to traverse said passages in the fruit receptacle, said cutting mechanism embodying radially positioned blades provided with downwardly curved cutting edges adapted to cut fruit confined within said receptacle without exerting substantial pressure upon the fruit.

15. In a device of the class described, a frame, a reciprocating cutter carried thereby, said cutter being provided with a group of knives having inclined cutting edges radiating from a common center, a chambered fruit supporting device provided with radial slots corresponding in number and position to said knives, said slots being positioned for the knives to pass therethrough, and a juice collecting receptacle substantially incasing the fruit supporting device for receiving any juice which may be expressed during the cutting operation.

16. In a device of the class described, a frame, a fruit supporting device provided with slots, cutting mechanism movable on said frame, the knives of said cutting mechanism being adapted to traverse the fruit supporting device and the slots therein, and a slotted stripper supported on the frame above the fruit supporting device.

17. A cutting device comprising a standard having a support connected therewith, a guiding ring having a central opening and a plurality of radiating slots, a reciprocating cutter having a plurality of radial blades and means for moving said cutter through the guide ring for the purpose of cutting the article held between the support and guide ring, as set forth.

18. A cutting device comprising a standard, a support connected therewith having a central opening and a plurality of radiating slots, a guide ring movable upon the standard and having a central opening and a plurality of radiating slots, and a reciprocating cutter comprising a plurality of radiating blades, said cutter being movable upon the standard and means connected with said standard for moving said cutter, as set forth.

In testimony whereof we have signed our names to this specification, in the presence of two subscribing witnesses.

CHARLES E. ROYER.
AUGUST A. RICKERT.

Witnesses:
FRANCIS CARRICK,
C. R. DENCH.